United States Patent
Nagai et al.

(10) Patent No.: US 12,481,153 B2
(45) Date of Patent: *Nov. 25, 2025

(54) VEHICLE

(71) Applicant: MAXELL, LTD., Kyoto (JP)

(72) Inventors: Toshimasa Nagai, Kyoto (JP);
Toshinori Sugiyama, Kyoto (JP);
Chohei Ono, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/964,829

(22) Filed: Dec. 2, 2024

(65) Prior Publication Data

US 2025/0093645 A1   Mar. 20, 2025

Related U.S. Application Data

(63) Continuation of application No. 17/921,368, filed as application No. PCT/JP2021/015168 on Apr. 12, 2021, now Pat. No. 12,196,956.

(51) Int. Cl.
G02B 27/01 (2006.01)
B60R 1/20 (2022.01)
(Continued)

(52) U.S. Cl.
CPC ............. G02B 27/01 (2013.01); B60R 1/20 (2022.01); F21V 7/09 (2013.01); G02B 6/0011 (2013.01);
(Continued)

(58) Field of Classification Search
CPC ...... G02B 27/01; G02B 27/30; G02B 6/0011; F21V 7/09; B60R 1/20
See application file for complete search history.

(56) References Cited

U.S. PATENT DOCUMENTS 4,420,800 A * 12/1983 Van Horn ................. F21V 7/09
362/310
2020/0189363 A1   6/2020 Sugiyama et al.
(Continued)

FOREIGN PATENT DOCUMENTS

CN   207762609 U   8/2018
DE   102017220375 A1   5/2019
(Continued)

OTHER PUBLICATIONS

International Search Report of PCT/JP2021/015168 dated Jun. 1, 2021.

*Primary Examiner* — Christopher E Dunay
(74) *Attorney, Agent, or Firm* — MATTINGLY & MALUR, PC (57) ABSTRACT

A light source apparatus and the like capable of improving the manufacturing yield are provided. The light source apparatus includes a light source, a collimator which is arranged to face the light source and includes a reflection portion for adjusting a focal length of light incident from the light source to the collimator, and a light guide arranged on an emission side of the collimator. The reflection portion of the collimator includes a normal focus area in which the light emitted from the light source and incident to the collimator is converted into substantially parallel light, a long focus area in which the light incident to the collimator is converted into slightly divergent light in comparison with the substantially parallel light, and a short focus area in which the light incident to the collimator is converted into slightly convergent light in comparison with the substantially parallel light.

7 Claims, 10 Drawing Sheets

(51) Int. Cl.
*F21V 7/09* (2006.01)
*F21V 8/00* (2006.01)
*G02B 27/30* (2006.01)
*F21Y 115/10* (2016.01)

(52) U.S. Cl.
CPC ........ *G02B 27/30* (2013.01); *B60R 2300/205* (2013.01); *F21Y 2115/10* (2016.08); *G02B 2207/113* (2013.01)

(56) References Cited

U.S. PATENT DOCUMENTS

| | | | |
|---|---|---|---|
| 2020/0201043 A1 | 6/2020 | Sugiyama et al. | |
| 2022/0197025 A1* | 6/2022 | Hamada | G02B 5/0278 |
| 2023/0041447 A1* | 2/2023 | Huber | G09G 3/002 |
| 2023/0152586 A1* | 5/2023 | Mochizuki | G02B 27/01 |
| | | | 348/837 |
| 2023/0393389 A1* | 12/2023 | von Spiegel | G02B 27/0101 |
| 2024/0036311 A1* | 2/2024 | Mochizuki | B60K 35/50 |

FOREIGN PATENT DOCUMENTS

| | | |
|---|---|---|
| JP | 2020060784 A | 4/2020 |
| WO | 2018/229961 A1 | 12/2018 |

* cited by examiner

$Z = 0.033287R^8 - 0.84426R^7 + 8.9615R^6 - 51.344R^5 + 169.61R^4 - 313.76R^3 + 268.15R^2 - 113.13$ (FOUR AT CENTER) ... EQUATION 1

$Z = 0.030607R^8 - 0.77187R^7 + 8.1398R^6 - 46.290R^5 + 151.63R^4 - 277.85R^3 + 234.98R^2 - 97.641$ (FOUR ON BOTH SIDES) ... EQUATION 2

$Z = -0.01706R^4 + 0.22092R^3 - 0.88788R^2 + 2.58040R - 8.48141$ ⋯ EQUATION 3

VEHICLE

TECHNICAL FIELD

The present invention relates to a light source apparatus a head up display apparatus.

BACKGROUND ART

Patent Document 1 discloses a light source apparatus that is compact and lightweight, has a high light utilization rate, and can be modularized and easily used as a planar light source. The light source apparatus of Patent Document 1 includes a light source having a plurality of semiconductor light source elements, a collimator having a plurality of collimator elements each arranged on a light emission axis of each of the plurality of semiconductor light source elements, a polarization conversion element arranged on an emission side of the collimator, and a light guide arranged on an emission side of the polarization conversion element.

Also, the plurality of semiconductor light source elements and the plurality of collimator elements are arranged in a first direction (X direction) perpendicular to the light emission axis, and the polarization conversion element includes a polarization beam splitter and a phase plate which extend in the first direction and are arranged at symmetrical positions with respect to a plane formed by the first direction and a second direction corresponding to the light emission axis.

RELATED ART DOCUMENTS

Patent Documents

Patent Document 1: International Patent Publication No. 2018-229961

SUMMARY OF THE INVENTION

Problems to be Solved by the Invention

The light source apparatus of Patent Document 1 is used for, for example, an in-vehicle head up display (hereinafter, described as "HUD" in some cases). The HUD displays various types of information such as driving information including vehicle speed and engine speed and navigation information, by projecting them onto a windshield (front glass) or the like. By using the HUD, the driver can obtain the information necessary for driving without moving the line of sight to indicators built in the dashboard, that is, instrument panel. Therefore, the HUD contributes to safe driving of automobiles and the like.

By the way, if the relative positions of the light source and the collimator deviate from the predetermined positions, the display image luminance and the display image luminance unevenness deviate from predetermined design values in some cases. Note that the display image luminance unevenness mentioned here is a value obtained by dividing the minimum luminance in the display image by the central luminance of the display image. In other words, the luminance unevenness is defined by the ratio of the minimum luminance in the display image to the central luminance of the display image.

A product whose display image luminance and display image luminance unevenness deviate from the design values is regarded as a defective product. However, since high accuracy is required for alignment between the light source and the collimator, it is difficult to improve the manufacturing yield.

The present invention has been made in view of the above, and one of the objects thereof is to provide a light source apparatus and the like capable of improving the manufacturing yield.

The above and other objects and novel features of the present invention will become apparent from the description of this specification and accompanying drawings.

Means for Solving the Problems

An outline of the typical invention disclosed in this application will be briefly described as follows. A typical light source apparatus includes: a light source; a collimator which is arranged to face the light source and includes a reflection portion for adjusting a focal length of light incident from the light source to the collimator; and a light guide arranged on an emission side of the collimator. The reflection portion of the collimator includes: a normal focus area in which the light emitted from the light source and incident to the collimator is converted into substantially parallel light; a long focus area in which the light incident to the collimator is converted into slightly divergent light in comparison with the substantially parallel light; and a short focus area in which the light incident to the collimator is converted into slightly convergent light in comparison with the substantially parallel light.

Effects of the Invention

The effect obtained by the typical invention disclosed in this application will be briefly described below. That is, it is possible to improve the manufacturing yield in the head up display apparatus.

DETAILED DESCRIPTION OF PREFERRED EMBODIMENTS

Hereinafter, an embodiment of the present invention will be described in detail with reference to the drawings. Note that the same members are denoted by the same reference characters in all the drawings for describing the embodiment, and repetitive description thereof will be omitted in principle.

<<Outline of HUD Apparatus>>

Figure 1:
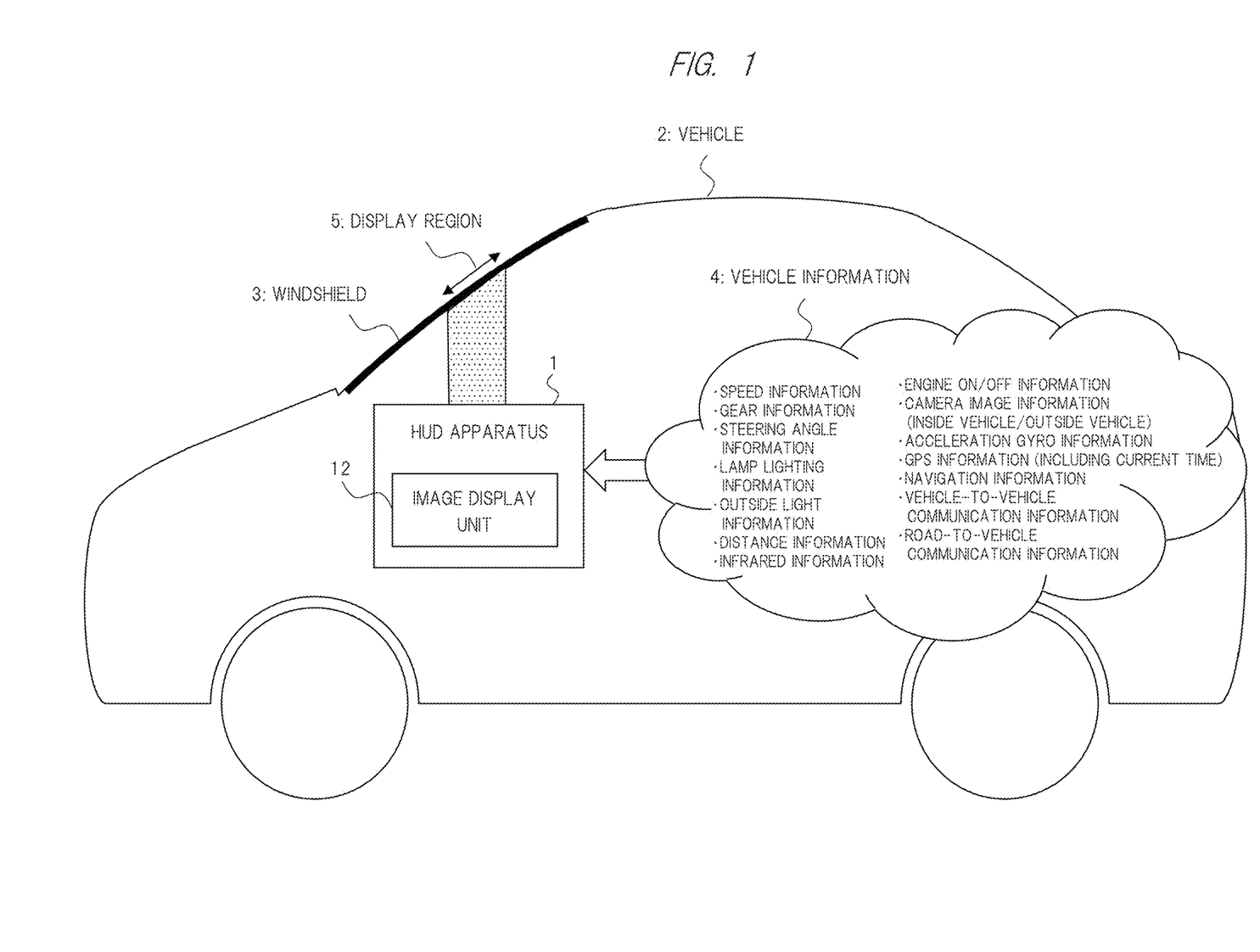
FIG. 1 is a schematic diagram showing a configuration example of a vehicle in which a head up display apparatus according to an embodiment of the present invention is mounted.

FIG. 1 is a schematic diagram showing a configuration example of a vehicle in which a head up display apparatus according to an embodiment of the present invention is mounted. A head up display (HUD) apparatus 1 in FIG. 1 is mounted in a vehicle 2. The vehicle 2 is typically an automobile, but is not necessarily limited to this and may be a railroad vehicle or the like in some cases. The HUD apparatus 1 acquires vehicle information 4 from various sensors and others provided at each part of the vehicle 2. For example, the various sensors detect various events occurring in the vehicle 2, and periodically detect the values of various parameters related to driving conditions.

The vehicle information 4 includes, for example, speed information and gear information of the vehicle 2, steering angle information, lamp lighting information, outside light information, distance information, infrared information, engine ON/OFF information, vehicle inside/outside camera image information, acceleration gyro information, GPS (Global Positioning System) information, navigation information, vehicle-to-vehicle communication information, road-to-vehicle communication information, and others. The GPS information includes current time information. The HUD apparatus 1 projects a projection image onto a display region 5 of a windshield 3 by using an image display unit 12 based on the vehicle information 4. In this way, the HUD apparatus 1 allows the driver of the vehicle 2 to visually recognize the scenery on which the projected image is superimposed.

Figure 2:
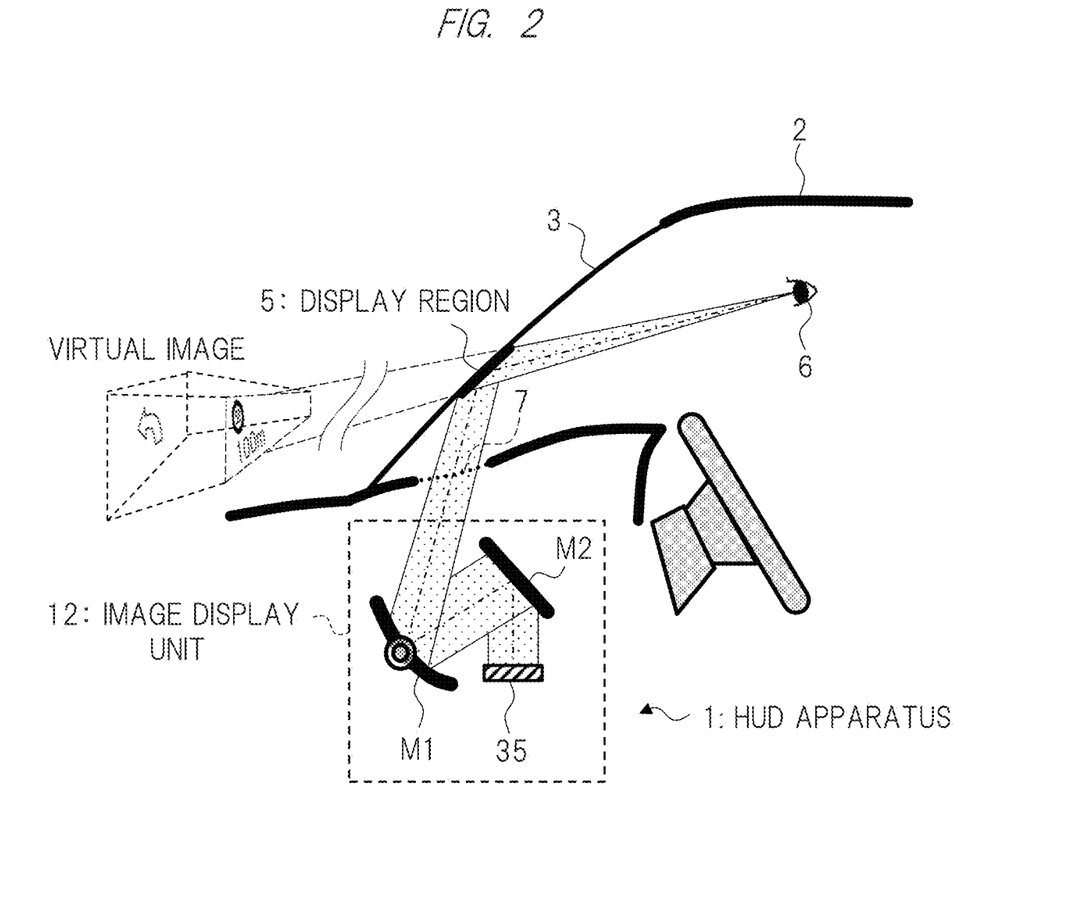
FIG. 2 is a schematic diagram showing a configuration example around the image display unit in FIG. 1.

FIG. 2 is a schematic diagram showing a configuration example around an image display unit in FIG. 1. The image display unit 12 shown in FIG. 2 includes an image display apparatus 35 and reflection mirrors M1 and M2. The reflection mirror M1 is, for example, a concave mirror (magnifying glass). The image display apparatus 35 is, for example, a projector that projects an image formed on an LCD (Liquid Crystal Display) by using projection light emitted from a light source apparatus 100 (described later in detail). The LCD creates and displays an image based on image data instructed by a controller. The reflection mirrors M1 and M2 are, for example, free-form mirrors or mirrors asymmetric in light axis. The reflection mirror M2 reflects the image created (displayed) by the image display apparatus 35 toward the mirror M1. The reflection mirror M1 reflects and expands the image reflected by reflection mirror M2 toward the windshield 3, and projects the image onto the display region 5 through an opening 7.

In this way, a driver 6 visually recognizes the projection image projected on the display region 5 as a virtual image in front of the transparent windshield 3 in a form superimposed on the scenery (roads, buildings, people, etc.) outside the vehicle. The projection image (virtual image) includes various information such as road signs, the current speed of the vehicle, and information (AR information) added to objects in the scenery. In FIG. 2, the position of the display region 5 on the windshield 3 can be adjusted by, for example, adjusting an installation angle of the reflection mirror M1, and the position of the virtual image to be virtually recognized by the driver 6 can be adjusted vertically. Further, the area of the display region 5 can be increased by, for example, increasing the area of the reflection mirror M1, and more information can be projected onto the display region 5. In this way, an AR function of making a display while adding various information on the objects in the scenery can be realized.

Figure 3:
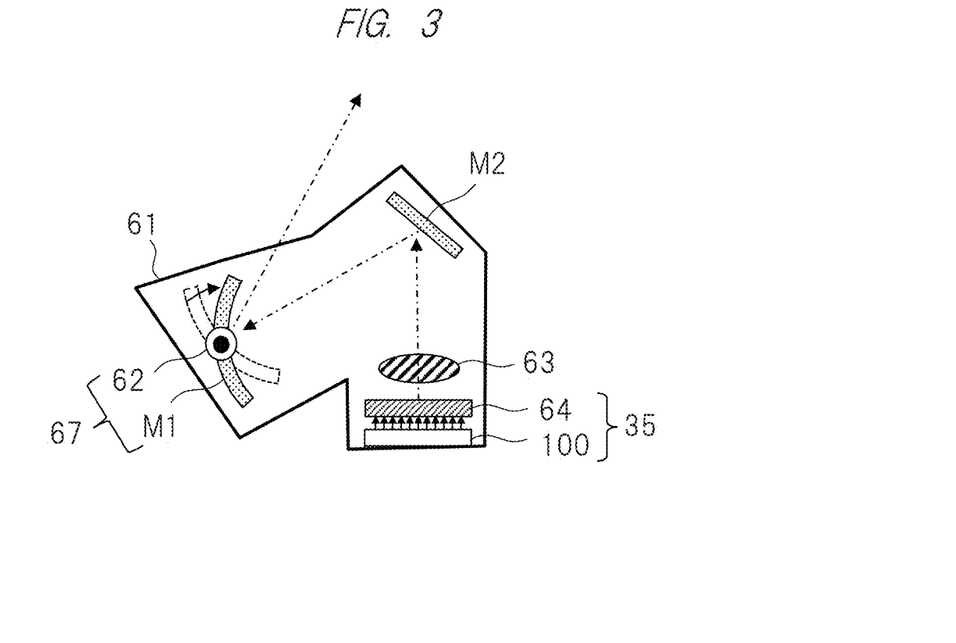
FIG. 3 is a diagram showing detailed configuration example and operation example around the image display unit in FIG. 2.
Figure 4:
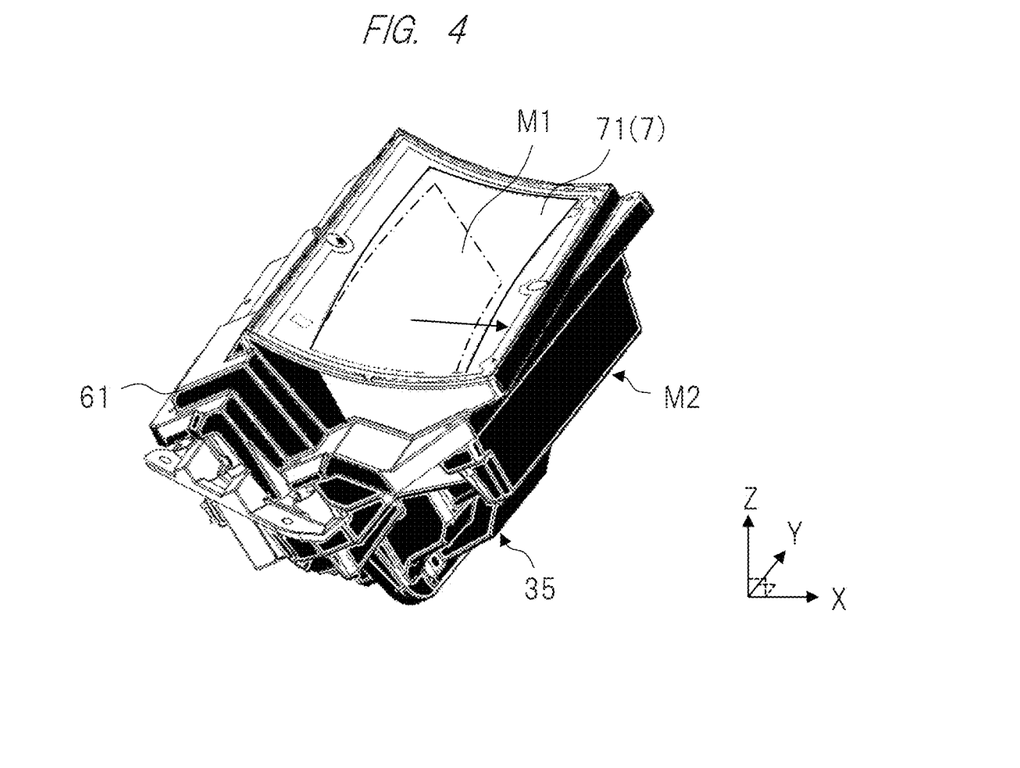
FIG. 4 is a perspective view showing an example of an external form of the HUD apparatus including the image display unit in FIG. 3.

FIG. 3 is a diagram showing detailed configuration example and operation example around the image display unit in FIG. 2. FIG. 4 is a perspective view showing an example of an external form of the HUD apparatus including the image display unit in FIG. 3. As shown in FIG. 3, the image display apparatus 35 in FIG. 2 specifically includes a light source apparatus 100 that emits projection light and a display panel 64 that creates (displays) an image to be projected onto the display region 5 by modulating the projection light from the light source apparatus 100. The light source apparatus 100 typically includes an LED (Light Emitting Diode) light source. The display panel 64 is typically a liquid crystal panel (LCD), and forms an image corresponding to image data by modulating the transmittance of light from the light source apparatus 100 for each pixel in accordance with the input image data.

A condenser lens 63 is installed between the display panel 64 and the reflection mirror M2. A driving mechanism 62 for changing the installation angle of the reflection mirror M1 is attached to the reflection mirror M1. The driving mechanism 62 includes a stepping motor and the like. The driving mechanism 62 adjusts the position of the virtual image by changing the installation angle of the reflection mirror M1.

Further, in FIG. 3, the image display apparatus 35, the reflection mirror M1 with the driving mechanism 62, the reflection mirror M2, and the condenser lens 63 are accommodated in a housing 61 together with various controllers (not shown).

In FIG. 4, the opening 7 is formed in the housing 61, and a transparent cover member 71 referred to as a glare trap or the like is attached in the opening 7. As shown in FIG. 3, the reflection mirror M1 is installed in the housing 61 so as to reflect the light from the reflection mirror M2 toward the cover member 71 (opening 7).

<<Configuration of Light Source Apparatus>>

Figure 5:
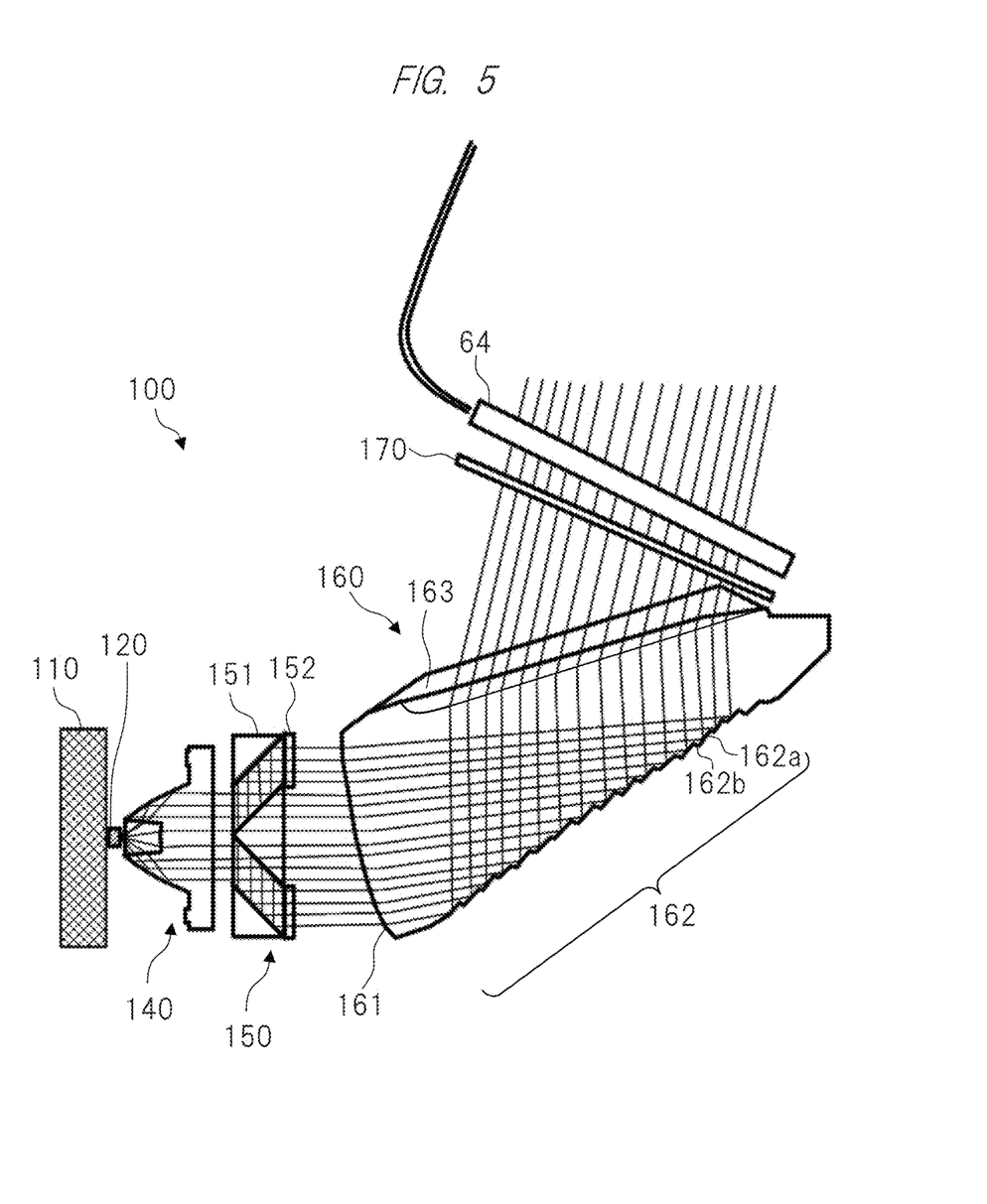
FIG. 5 is a cross-sectional view showing an example of a configuration of a light source apparatus.

Next, the configuration of the light source apparatus 100 will be described. FIG. 5 is a cross-sectional view showing an example of the configuration of the light source apparatus. As shown in FIG. 5, the light source apparatus 100 includes an LED element (light source) 120 provided on a substrate 110, a collimator 140, a polarization conversion element 150, a light guide 160, and others. Although only one LED element is shown in FIG. 5, a plurality of (e.g., eight) LED elements 120 are provided on the substrate 110.

The collimator 140 is provided for each LED element, and each collimator is installed at a predetermined position (relative position) with respect to the corresponding LED element 120. Namely, the number of collimators 140 is the same as the number of LED elements 120. The collimator 140 is an optical member that adjusts the traveling direction of the light that is emitted from the LED element 120 and is incident to the collimator 140. Specifically, the collimator 140 converts the incident light into substantially parallel light by appropriately optimizing the shape of the reflection portion 142.

The polarization conversion element 150 is provided on the emission side of the collimator 140, that is, on the side opposite to the LED element 120. The collimator 140 converts the light emitted from the LED element 120 into substantially parallel light such that it travels toward the polarization conversion element 150.

Figure 6:
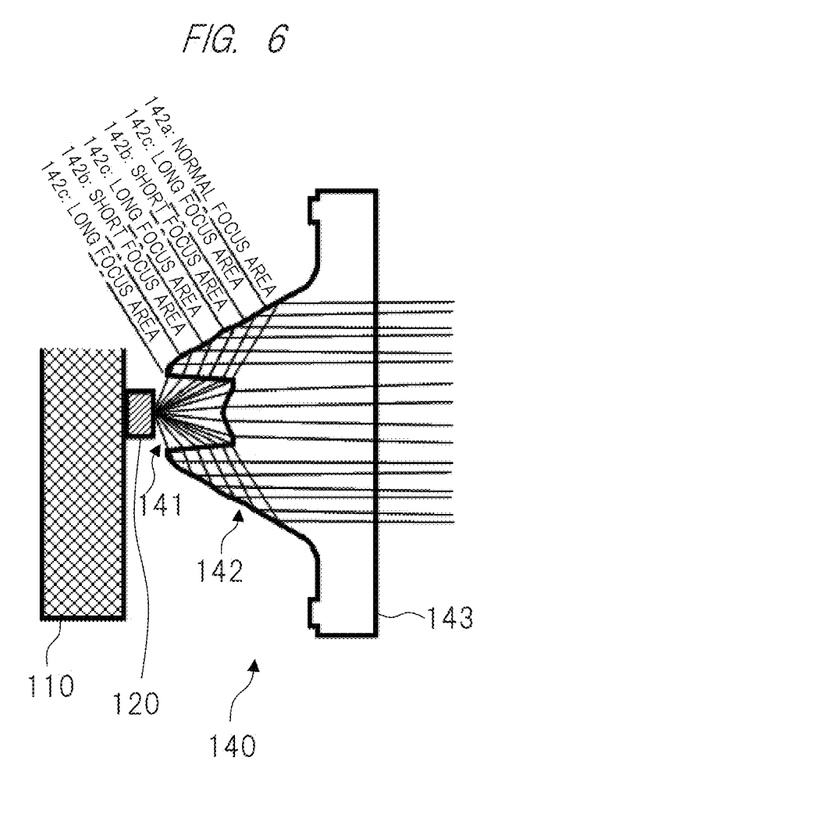
FIG. 6 is a cross-sectional view showing an example of a configuration of a collimator.

FIG. 6 is a cross-sectional view showing an example of the configuration of the collimator. As shown in FIG. 6, an incident portion 141 of the collimator 140 faces the LED element 120 and has a concave shape with respect to the LED element 120.

Here, the area in which the light emitted from the center of the LED element 120 is converted into substantially parallel light in the reflection portion 142 of the collimator 140 is defined as a normal focus area, the area in which the light is converted into relatively divergent light with respect to the substantially parallel light in the reflection portion 142 is defined as a long focus area, and the area in which the light is converted into relatively convergent light with respect to the substantially parallel light in the reflection portion 142 is defined as a short focus area.

As shown in FIG. 6, the reflection portion 142 of the collimator 140 includes a normal focus area 142a in which the light that is emitted from the LED element 120 and is incident to the collimator 140 is converted into substantially parallel light, a long focus area 142c in which the incident light is converted into slightly divergent light in comparison with the substantially parallel light, and a short focus area 142b in which the incident light is converted into slightly convergent light in comparison with the substantially parallel light.

The normal focus area 142a, the short focus area 142b, and the long focus area 142c each differ in the curvature of the outer reflection surface. The short focus area 142b has a larger curvature of the reflection surface than that of the normal focus area 142a. On the other hand, the long focus area 142c has a smaller curvature of the reflection surface than that of the normal focus area 142a. In FIG. 6, when viewed from the side with the LED element 120, a plurality of long focus areas 142c and short focus areas 142b are alternately formed. Further, the normal focus area 142a is formed at the farthest position from the LED element 120. Note that the arrangement of the respective focus areas is not limited to this, and for example, the normal focus area 142a, the short focus area 142b, and the long focus area 142c may be provided alternately. Also, the short focus area 142b or the long focus area 142c may be provided at the farthest position from the LED element 120.

By providing the normal focus area 142a, the short focus area 142b, and the long focus area 142c in the reflection portion 142 of the collimator 140 in this way, even if the relative position of the collimator 140 with respect to the LED element 120 deviates, fluctuations in the display image luminance and the display image luminance unevenness are suppressed.

The shape of the reflection portion 142 may be different for each collimator 140. For example, when a plurality of collimators 140 are arranged in a line, the shape of the reflection portion 142 may be different between the collimator 140 at the center and the collimator 140 on the end side. This makes it possible to optimize the optical system, improve the optical performance, and improve the light utilization efficiency.

Also, the adjacent focus areas are smoothly connected. In the example of FIG. 6, the short focus area 142b and the long focus area 142c are smoothly connected. Further, the long focus area 142c and the normal focus area 142a are smoothly connected. Note that the short focus area 142b and the normal focus area 142a are smoothly connected also in case other than FIG. 6. Namely, the normal focus area 142a, the short focus area 142b, and the long focus area 142c are smoothly connected to each other.

Specifically, the curvature of each focus area is not uniform, and the curvatures of the respective focus areas are substantially the same in the region where the focus areas are in contact with each other. For example, the curvature of the region where the short focus area 142b and the long focus area 142c are connected is the same curvature as that of the normal focus area 142a. Therefore, the short focus area 142b and the long focus area 142c partially include the same function as that of the normal focus area 142a. Therefore, even if the number of normal focus areas 142a is small as in FIG. 6, deterioration in the performance of the light source apparatus 100 can be suppressed.

Figure 12:
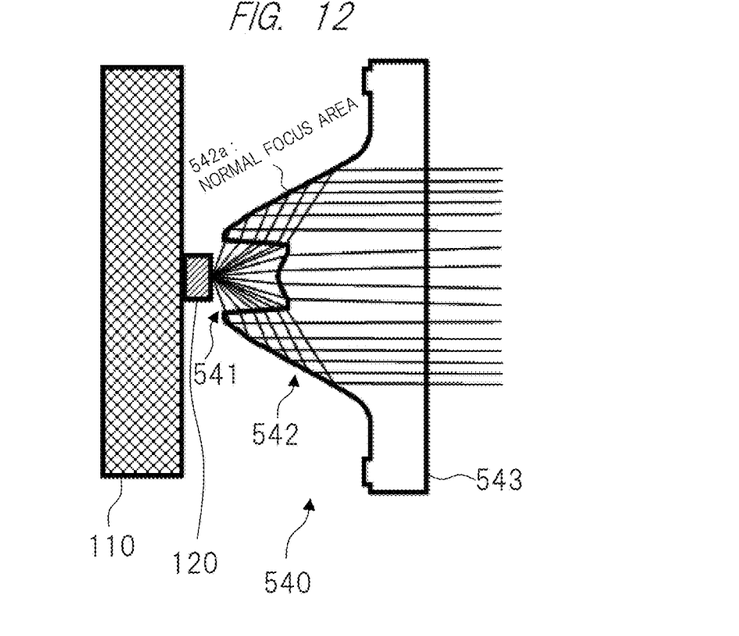
FIG. 12 is a cross-sectional view of a conventional collimator.

FIG. 12 is a cross-sectional view of a conventional collimator. As shown in FIG. 12, a reflection portion 542 of the conventional collimator 540 has only a normal focus area 542a. Therefore, if the relative position of the collimator 540 with respect to the LED element 120 deviates, fluctuations in the display image luminance and the display image luminance unevenness are large.

As shown in FIG. 5, the polarization conversion element 150 includes a polarization conversion prism 151 and a wave plate (retardation plate) 152. The polarization conversion prism 151 is arranged so as to face the collimator 140. A part of the light incident to the polarization conversion prism 151 passes through the polarization conversion prism 151 as it is. This light is emitted from the central portion of the polarization conversion prism 151 on the emission side and is incident to the light guide 160.

On the other hand, the other part of light is reflected in the polarization conversion prism 151 and is then emitted from a peripheral portion of the polarization conversion prism 151 on the emission side, which surrounds the central portion of the polarization conversion prism 151 on the emission side. A wave plate 152 is provided on the peripheral portion of the polarization conversion prism on the emission side, and the light emitted from the peripheral portion of the polarization conversion prism 151 on the emission side is incident to the wave plate 152. The light that has been incident to the wave plate 152 is subjected to a predetermined polarization conversion by the wave plate 152 and is then incident to the light guide 160.

As shown in FIG. 5, the light guide 160 has, for example, a pyramid shape with a substantially triangular cross section. As shown in FIG. 5, a light guide reflection portion 162 has a large number of reflection surfaces 162a and connection surfaces 162b alternately formed in a sawtooth shape. The light incident from a light guide incident portion 161 is reflected by the reflection surface 162a of the light guide reflection portion 162 and travels toward a light guide emission portion.

A diffusion plate 170 is provided at a position facing the light guide emission portion 163. Further, the display panel 64 is provided on the emission side of the diffuser plate 170. The intensity of the light emitted from the light guide emission portion 163 is made uniform by the diffusion plate 170. The light emitted from the diffusion plate 170 is incident to the display panel 64 as the projection light of an image. In this way, the light emitted from the collimator 140 is guided to the incident surface of the display panel 64 arranged above in the drawing by the action of the light guide 160.

<<Configuration of Control System of HUD Apparatus>>

Figure 7:
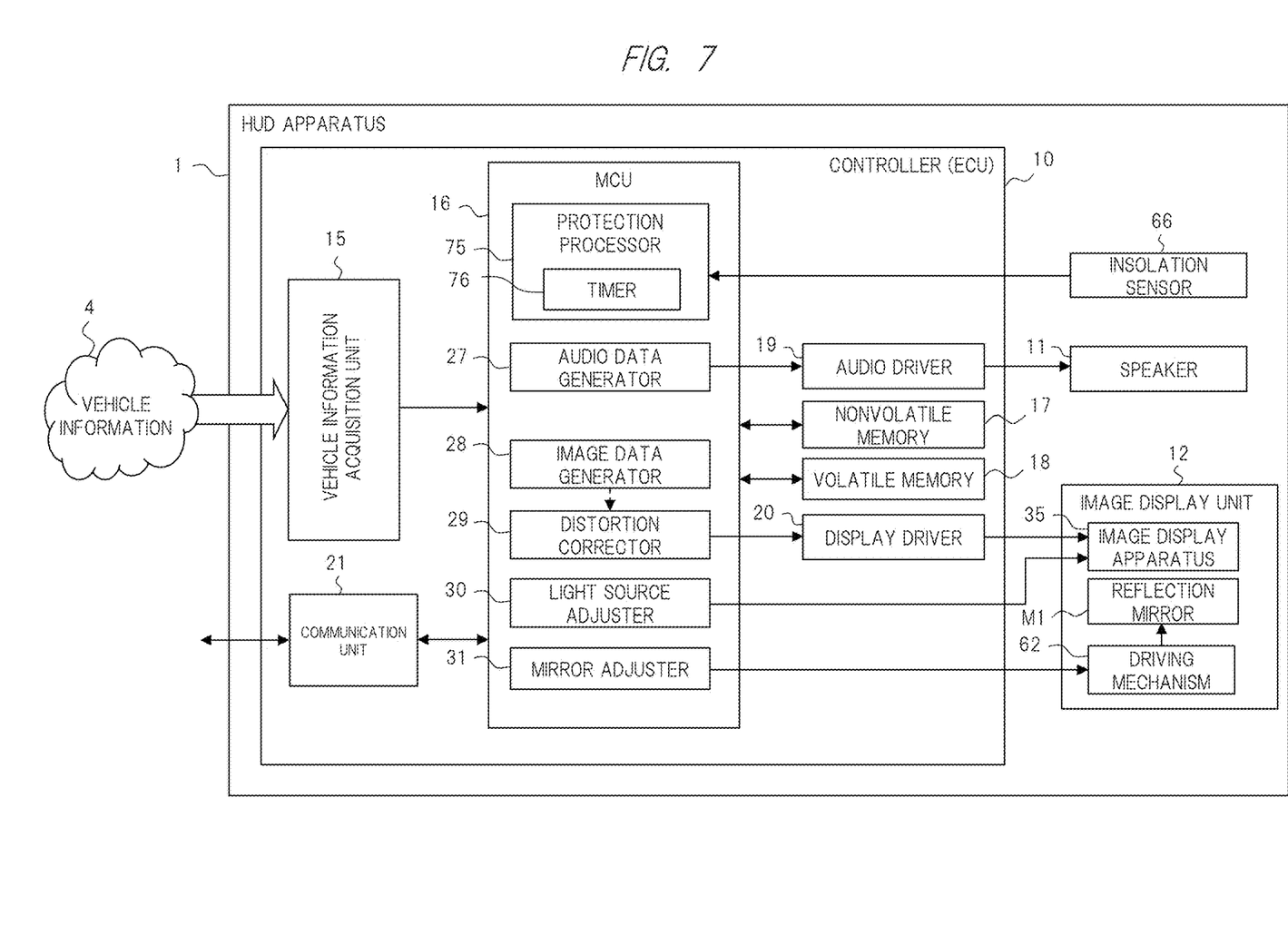
FIG. 7 is a block diagram showing a configuration example of a main part of a control system included in the head up display apparatus in FIG. 1.
Figure 8:
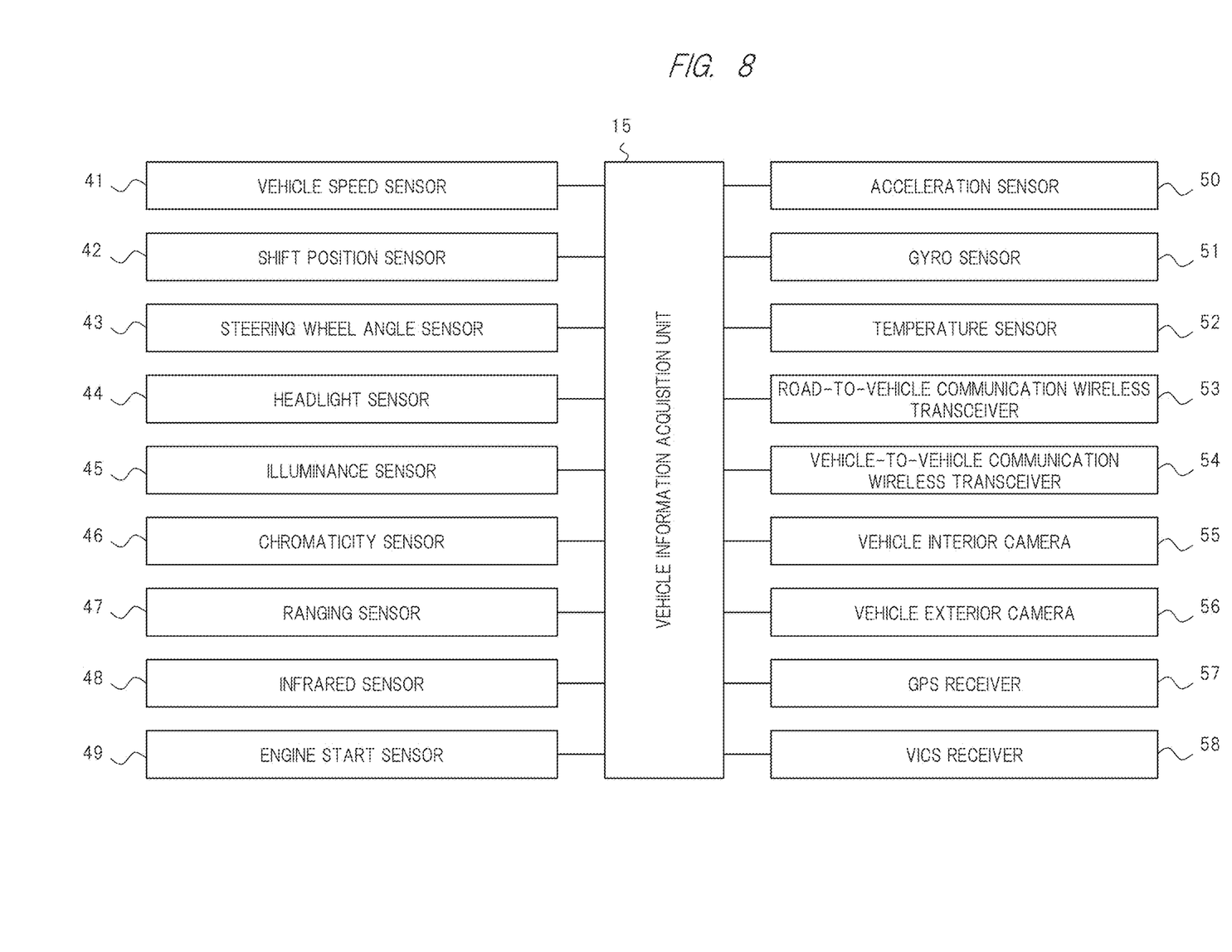
FIG. 8 is a block diagram showing a configuration example of a part related to acquisition of vehicle information in FIG. 7.

FIG. 7 is a block diagram showing a configuration example of a main part of a control system included in the head up display apparatus in FIG. 1. FIG. 8 is a block diagram showing a configuration example of a part related to acquisition of vehicle information in FIG. 7. The head up display (HUD) apparatus 1 shown in FIG. 7 includes a controller (ECU: Electronic Control Unit) 10, a speaker 11, and an image display unit 12. The image display unit 12 includes the image display apparatus 35, the reflection mirror M1 with the driving mechanism 62, and the like shown in FIG. 3.

The controller 10 mainly controls the display of the projection image (virtual image), the audio output, and the like in the HUD apparatus 1. The controller 10 is composed of, for example, a wiring board or the like, and the wiring board is mounted in, for example, the housing 61 shown in FIG. 4. The controller 10 includes a vehicle information acquisition unit 15, a microcontroller (MCU) 16, a nonvolatile memory 17, a volatile memory 18, an audio driver 19, a display driver 20, a communication unit 21, and the like mounted on the wiring board. As is widely known, the MCU 16 has various peripheral functions in addition to a CPU (Central Processing Unit). Therefore, each block except the MCU 16 in the controller 10 in FIG. 7 may be mounted in the MCU 16 as appropriate.

The vehicle information acquisition unit 15 is, for example, a CAN (Controller Area Network) interface or an LIN (Local Interconnect Network) interface, and acquires the vehicle information 4 based on a communication protocol such as CAN or LIN. The vehicle information 4 is generated by information acquisition devices such as various sensors connected to the vehicle information acquisition unit 15 as shown in FIG. 8. FIG. 8 shows an example of the various information acquisition devices.

For example, a vehicle speed sensor 41 detects the speed of the vehicle 2 in FIG. 1 and generates speed information as a detection result. A shift position sensor 42 detects the current gear and generates gear information as a detection result. A steering wheel angle sensor 43 detects the current steering wheel angle and generates steering wheel angle information as a detection result. A headlight sensor 44 detects ON/OFF of the headlight and generates lamp lighting information as a detection result.

An illuminance sensor 45 and a chromaticity sensor 46 detect the outside light and generate outside light information as a detection result. A ranging sensor 47 detects the distance between the vehicle 2 and an external object and generates distance information as a detection result. An infrared sensor 48 detects the presence or absence of an object in the short distance of the vehicle 2, the distance from it, and the like and generates infrared information as a detection result. An engine start sensor 49 detects ON/OFF of the engine and generates ON/OFF information as a detection result.

An acceleration sensor 50 and a gyro sensor 51 detect the acceleration and angular velocity of the vehicle 2, respectively, and generate acceleration gyro information indicating the posture and behavior of the vehicle 2 as a detection result. A temperature sensor 52 detects the temperature inside and outside the vehicle and generates temperature information as a detection result. For example, an ambient temperature Ta of the HUD apparatus 1 can be detected by the temperature sensor 52. However, as described with reference to FIG. 4, a temperature sensor may be separately mounted in the HUD apparatus 1.

A road-to-vehicle communication wireless transceiver 53 generates road-to-vehicle communication information through road-to-vehicle communication between the vehicle 2 and roads, signs, signals, and the like. A vehicle-to-vehicle communication wireless transceiver 54 generates vehicle-to-vehicle communication information through vehicle-to-vehicle communication between the vehicle 2 and other vehicles in the vicinity. A vehicle interior camera 55 and a vehicle exterior camera 56 generate vehicle interior camera image information and vehicle exterior camera image information by capturing the interior and exterior of the vehicle, respectively. Specifically, the vehicle interior camera 55 is, for example, a DMS (Driver Monitoring System) camera that captures the posture and the position and movement of the eyes of the driver 6 in FIG. 2. In this case, it is possible to grasp the fatigue state of the driver 6, the position of the line of sight, etc. by analyzing the captured image.

On the other hand, for example, the vehicle exterior camera 56 captures surrounding conditions in front of and at the back of the vehicle 2. In this case, it is possible to grasp the presence or absence of obstacles such as other vehicles and people in the vicinity, buildings and topography, rain and snow, road surface conditions such as freezing and unevenness, traffic signs, and the like by analyzing the captured image. In addition, the vehicle exterior camera 56 includes, for example, a drive recorder that records a video of the driving situation.

A GPS receiver 57 generates GPS information obtained by receiving GPS signals. For example, it is possible to obtain the current time by the GPS receiver 57. A VICS (Vehicle Information and Communication System, registered trademark) receiver 58 generates VICS information obtained by receiving VICS signals. The GPS receiver 57 and the VICS receiver 58 may be provided as a part of the navigation system. Note that the various information acquisition devices in FIG. 8 can be appropriately deleted, added with other types of devices, or replaced with other types of devices.

In FIG. 7, the MCU 16 receives such vehicle information 4 via the vehicle information acquisition unit 15, and generates audio data directed to the speaker 11, image data directed to the image display apparatus 35, etc. based on the vehicle information 4 and the like. Specifically, the MCU 16 includes an audio data generator 27, an image data generator 28, a distortion corrector 29, a light source adjuster 30, a mirror adjuster 31, and a protection processor 75. These units are mainly implemented by executing programs stored in the nonvolatile memory 17 or the volatile memory 18 by the CPU.

The audio data generator 27 generates audio data based on the vehicle information 4 or the like as necessary. For example, the audio data is generated when performing audio guidance of the navigation system or when issuing a warning to the driver 6 by the AR function. The audio driver 19 drives the speaker 11 based on the audio data and causes the speaker 11 to output audio.

The image data generator 28 generates image data that determines the display content of the projection image projected onto the display region 5 shown in FIG. 2 and the like, based on the vehicle information 4 or the like. The distortion corrector 29 generates corrected image data obtained by applying distortion correction to the image data from the image data generator 28. Specifically, the distortion corrector 29 corrects image distortion caused by the curvature of the windshield 3 when the image from the image display apparatus 35 is projected onto the display region 5 as shown in FIG. 2.

The display driver 20 drives each display element (pixel) included in the display panel 64 in the image display apparatus 35 based on the corrected image data from the distortion corrector 29. Consequently, the image display apparatus 35 creates (displays) the image to be projected onto the display region 5 based on the corrected image data. The light source adjuster 30 controls the luminance of a light source 65 in the image display apparatus 35. The mirror adjuster 31 changes the installation angle of the reflection mirror M1 in the image display unit 12 via the driving mechanism 62 when the position of the display region 5 on the windshield 3 needs to be adjusted.

The non-volatile memory 17 mainly stores programs executed by the CPU in the MCU 16, setting parameters used in the process of each unit in the MCU 16, prescribed audio data and image data, and the like in advance.

The volatile memory 18 mainly retains the acquired vehicle information 4 and various data used in the process of each unit in the MCU 16 as appropriate. The communication unit 21 communicates with the outside of the HUD apparatus 1 based on the communication protocol such as CAN or LIN. The communication unit 21 may be integrated with the vehicle information acquisition unit 15. Note that each unit in the controller (ECU) 10 in FIG. 4 may be implemented in an FPGA (Field Programmable Gate Array) or the like as appropriate.

EXAMPLE

Figure 9:
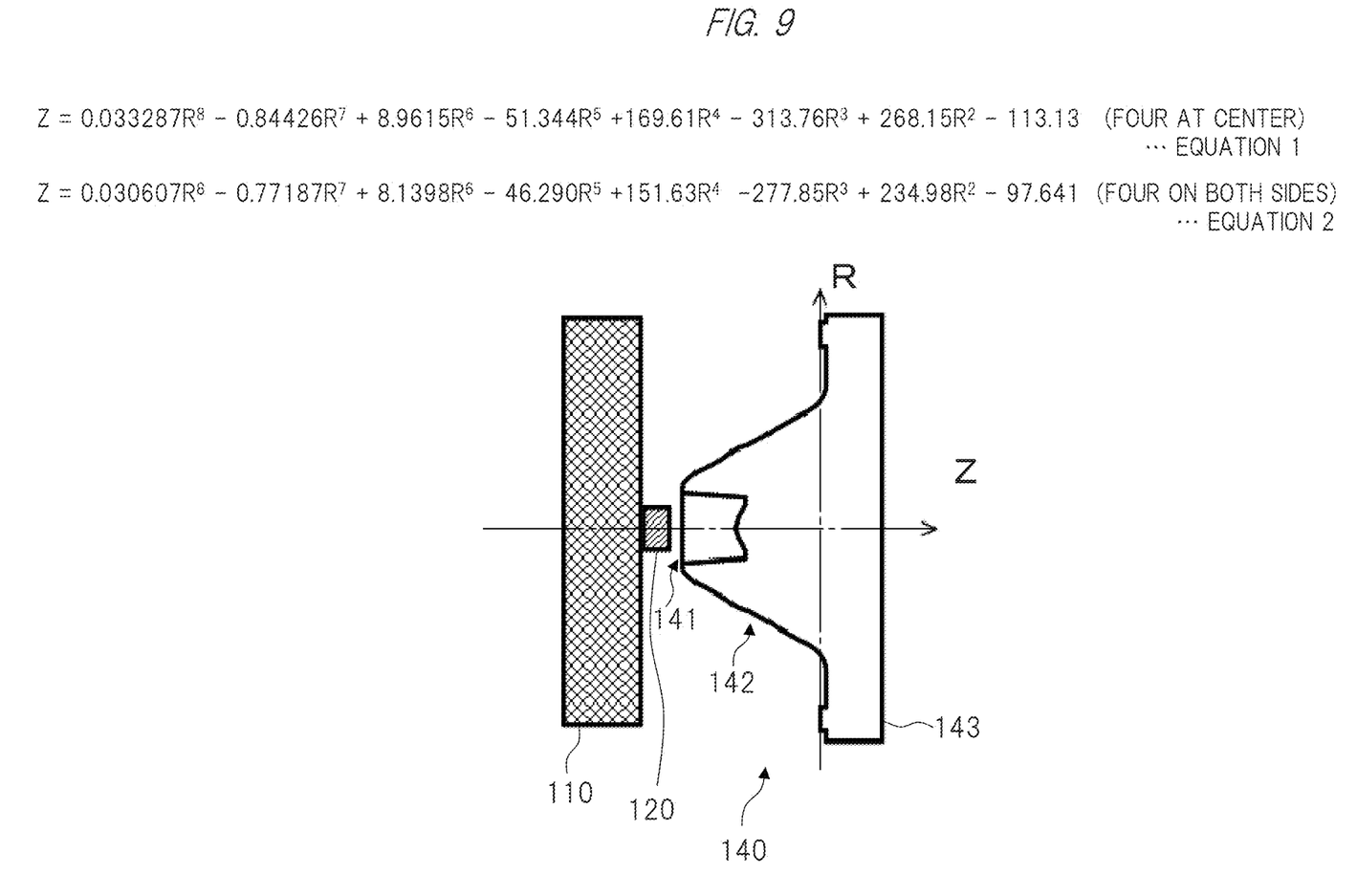
FIG. 9 is a diagram for describing a configuration of a collimator according to an example.

Next, an example of the HUD using the light source apparatus including the collimator 140 of the present embodiment will be described. FIG. 9 is a diagram for describing configuration of a collimator according to the example. In this example, eight collimators 140 arranged in a line are used.

The Z axis of FIG. 9 is an axis that passes through the center of the LED element 120 and the center of the collimator 140, and is, for example, the vertical direction of the LED substrate. The R axis which is the vertical direction in the drawing is an axis in the radial direction of the collimator. The intersecting point of the Z axis and the R axis is a reference point O. The configuration of the four reflection portions 142 at the center among the collimators arranged in a line is expressed by Equation 1 in FIG. 9. On the other hand, the configuration of the four reflection portions 142 on both ends among the collimators arranged in a line is expressed by Equation 2 in FIG. 9.

Here, the shape of the reflection surface (that is, external shape) of the reflection portion 142 is defined as a concentric circular shape around the Z axis in Equation 1 and Equation 2 with R>0.

Figure 13:
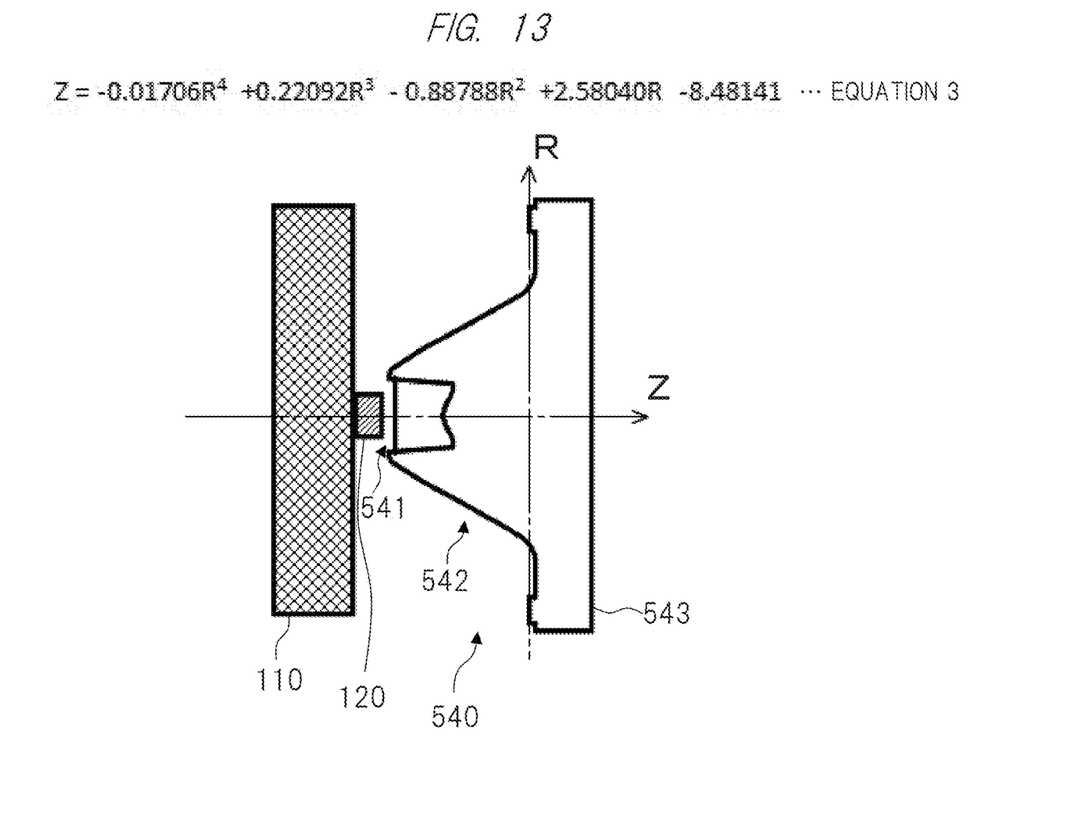
FIG. 13 is a diagram for describing a configuration of a collimator according to a comparative example.

FIG. 13 is a diagram for describing a configuration of a collimator according to a comparative example. The Z axis and the R axis shown in FIG. 13 are the same as those in FIG. 9. The configuration of a reflection portion 542 of a collimator 540 in the comparative example is expressed by Equation 3 in FIG. 13.

Figure 10:
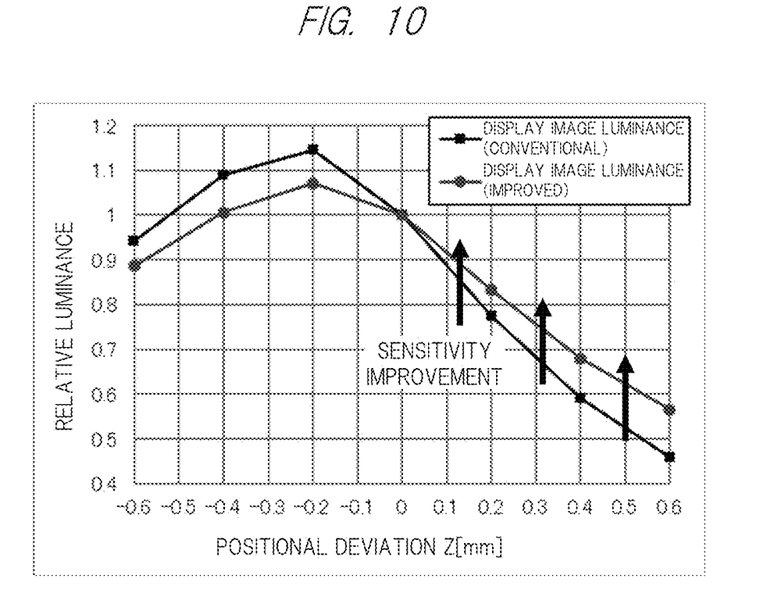
FIG. 10 is a diagram showing a distribution of display image luminance according to the example.

FIG. 10 is a diagram showing a distribution of display image luminance according to the example. Note that FIG. 10 shows also the result of using the collimator 540 of the comparative example described in FIG. 12. The horizontal axis of FIG. 10 represents the positional deviation of the collimator with respect to the LED element. "0" on the horizontal axis is the ideal mounting position of the collimator with respect to the LED element. The vertical axis of FIG. 10 represents the ratio (relative luminance) of display image luminance to display image luminance when the collimator is at an ideal position (hereinafter, referred to also as ideal display image luminance).

According to FIG. 10, when the collimator 140 according to this example deviates from the ideal position to the side opposite to the LED element 120 (positive side in the drawing), the degradation amount in display image luminance is smaller than that in the comparative example. In particular, as the collimator 140 moves away from the LED element 120, the difference in display image luminance from the comparative example increases, and an improvement in display image luminance can be seen.

When the collimator 140 according to this example deviates from the ideal position toward the LED element 120 (negative side in the drawing), the display image luminance is lower than that of the case where the conventional collimator 540 is used. However, the display image luminance in this region is 90% or more of the ideal display image luminance. Therefore, the display image luminance sufficient for use can be ensured even in this case, and the decrease in display image luminance in this region does not pose any problem. As described above, according to this example, even when the position of the collimator 140 deviates, fluctuation in the amount of projection light incident to the display panel 64 is suppressed.

Figure 11:
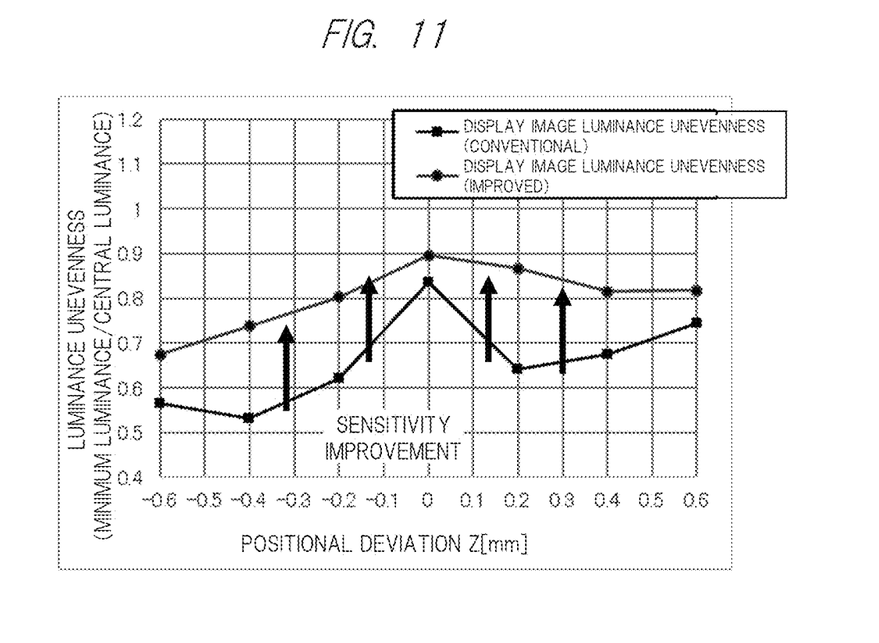
FIG. 11 is a diagram showing a distribution of display image luminance unevenness according to the example.

Next, the display image luminance unevenness will be described. FIG. 11 is a diagram showing the distribution of display image luminance unevenness according to the example. Note that FIG. 11 also shows the result of using the collimator 540 of the comparative example. The horizontal axis of FIG. 11 represents the positional deviation amount of the collimator 140 with respect to the LED element 120. "0" on the horizontal axis is the ideal position of the collimator 140 with respect to the LED element 120. The vertical axis of FIG. 11 represents the ratio of the minimum luminance in the display image to the central luminance of the display image as the display image luminance unevenness. Specifically, the vertical axis of FIG. 11 represents the display image luminance unevenness (relative luminance unevenness) with respect to the display image luminance unevenness when the collimator 140 is at an ideal position.

As shown in FIG. 11, in both the cases where the collimator 140 deviates from the ideal position toward the LED element 120 (negative side in the drawing) and where the collimator 140 deviates from the ideal position to the side opposite to the LED element 120 (positive side in the drawing), the relative luminance unevenness is improved. Namely, in this example, the display image luminance unevenness is reduced. As described above, according to this example, even when the position of the collimator 140 deviates, fluctuation in the amount of projection light between the respective regions of the display panel 64 is suppressed.

Main Effects of Present Embodiment

According to the present embodiment, the reflection portion 142 of the collimator 140 includes the normal focus area 142a, the short focus area 142b, and the long focus area 142c. With this configuration, even when the position (relative position) of the collimator 140 with respect to the LED element 120 deviates, the decrease in the display image luminance is suppressed, and the display image luminance unevenness is improved. As a result, the alignment accuracy between the LED element 120, which is the light source, and the collimator 140 can be moderated, so that the manufacturing yield can be improved.

Further, according to the present embodiment, the curvatures of the reflection surfaces of the normal focus area 142a, the short focus area 142b, and the long focus area 142c are different from each other. Specifically, the curvature of the reflection surface of the short focus area 142b is larger than that of the normal focus area 142a, and the curvature of the reflection surface of the long focus area 142c is smaller than that of the normal focus area 142a. With this configuration, even when the position of the t collimator 140 deviates, the decrease in the amount of projection light supplied to the display panel 64 and the fluctuation in the amount of projection light between respective regions of the display panel 64 are suppressed.

Further, according to the present embodiment, a plurality of long focus areas 142c and short focus areas 142b are alternately formed in the collimator 140. With this configuration, even when the position of the collimator 140 deviates, the decrease in the amount of projection light supplied to the display panel 64 and the fluctuation in the amount of projection light between respective regions of the display panel 64 are suppressed.

Also, according to the present embodiment, the normal focus area 142a, the short focus area 142b, and the long focus area 142c are smoothly connected to each other. With this configuration, the decrease in the amount of projection light supplied to the display panel 64 and the fluctuation in the amount of projection light between respective regions of the display panel 64 are suppressed while ensuring the amount of light when there is no positional deviation.

Moreover, according to the present embodiment, the shape of the reflection portion 142 differs for each collimator 140. With this configuration, it is possible to optimize the optical system of the light source apparatus 100.

In the foregoing, the invention made by the inventors of this application has been concretely described based on the embodiment. However, it is needless to say that the present invention is not limited to the foregoing embodiment and various changes can be made within the scope not departing from the gist thereof. For example, the above embodiment has described the present invention in detail in order to make the present invention easily understood, and the present invention is not necessarily limited to that having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

1: HUD apparatus, 3: windshield, 5: display region, 10: controller (ECU), 35: image display apparatus, 64: display panel, 100: light source apparatus, 140: collimator, 142: reflection portion, 142a: normal focus area, 142b: short focus area, 142c: long focus area, 160: light guide

The invention claimed is:

1. A vehicle comprising:
a windshield;
a light source apparatus;
a display panel configured to create an image to be projected onto the display region by modulating light from the light source apparatus; and
a reflection mirror configured to reflect the image created by the display panel and project it to the display region,
wherein the light source apparatus includes:
   a light source;
   a collimator which is arranged to face the light source and includes a reflection portion for adjusting a focal length of light incident from the light source; and
   a light guide arranged on an emission side of the collimator, and
wherein the reflection portion of the collimator includes:
   a normal focus area in which the light emitted from the light source and incident to the collimator is converted into substantially parallel light;
   a long focus area in which the light incident to the collimator is converted into slightly divergent light in comparison with the substantially parallel light; and
   a short focus area in which the light incident to the collimator is converted into slightly convergent light in comparison with the substantially parallel light.

2. The vehicle according to claim 1,
wherein curvatures of reflection surfaces in the normal focus area, the short focus area, and the long focus area are different from each other.

3. The vehicle according to claim 2,
wherein the curvature of the reflection surface in the short focus area is larger than the curvature of the reflection surface in the normal focus area, and the curvature of the reflection surface in the long focus area is smaller than the curvature of the reflection surface in the normal focus area.

4. The vehicle according to claim 1,
wherein a plurality of the long focus areas and the short focus areas are alternately formed in the collimator.

5. The vehicle according to claim 1,
wherein the normal focus area, the short focus area, and the long focus area are smoothly connected to each other.

6. The vehicle according to claim 1, further comprising:
a plurality of the light sources; and
a plurality of the collimators corresponding to the respective light sources,
wherein a shape of the reflection portion differs for each of the collimators.

7. The vehicle according to claim 1, further comprising:
a plurality of the light sources; and
a plurality of the collimators corresponding to the respective light sources,
wherein the plurality of light sources are arranged in a line, and
wherein a shape of the reflection portion differs between the collimator corresponding to the light source at the center and the collimator corresponding to the light source on an end side.

* * * * *